Figure 1:
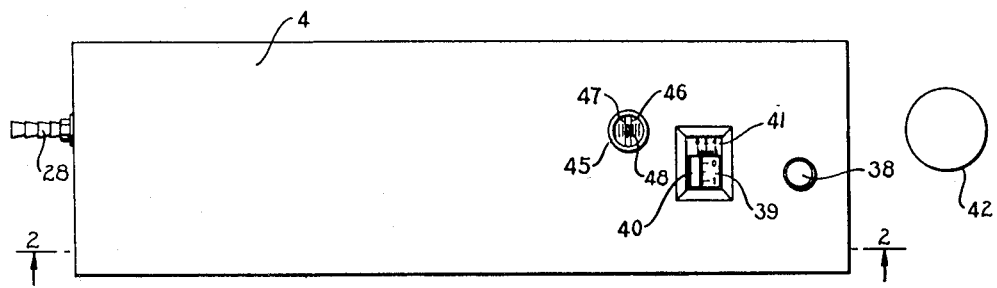

Sept. 23, 1941.   R. T. HURLEY   2,256,804

PRESSURE MEASURING MEANS

Filed Oct. 21, 1937

INVENTOR.
Roy T. Hurley
BY F. Bascom Smith
ATTORNEY.

Patented Sept. 23, 1941

2,256,804

UNITED STATES PATENT OFFICE 2,256,804

PRESSURE MEASURING MEANS

Roy T. Hurley, Dobbs Ferry, N. Y., assignor to Bendix Aviation Corporation, South Bend, Ind., a corporation of Delaware Application October 21, 1937, Serial No. 170,155

7 Claims. (Cl. 88—14)

This invention relates to a measuring device, and more particularly to means for measuring, with great accuracy, altitude or barometric pressure.

A vital need exists for accurate barometric pressure readings, especially in the development of the arts of blind landing of aircraft, bombing from aircraft and for photogrammetric purposes. Heretofore, the accuracy of altimeters in aircraft has been limited by the accuracy of the determination of pressure by the mercury barometer. The provision of an accurate reading of the barometric pressure by which the altimeter may be set will remove that limitation and will increase the accuracy of said altimeter readings to within a very few feet of the actual altitude.

It is accordingly an object of this invention to provide a novel pressure measuring device adapted to give pressure readings to a far greater degree of uniformity and accuracy than the pressure measuring devices at present known to the art. It is another object of the invention to provide a novel altimeter adapted to register altitude changes without any lag.

It is a further object of the invention to provide a novel pressure measuring device which may be readily calibrated.

It is another object of the invention to provide a novel altitude or barometric pressure measuring device using a vacuum as a standard instead of the usual sea level barometer reading.

A still further object of this ivention is to provide novel pressure measuring means adapted to give a distinct and clearly discernible indication of a correct setting of said means.

A still further object is the provision of novel apparatus for measuring altitudes and barometric pressures that is not affected by gravity nor disturbed by changing accelerations.

Still another object of the present invention is the provision of novel barometric pressure measuring apparatus comprising a compact unit of simple construction.

The above and further objects and novel features of the invention will more fully appear from the following detailed description when the same is taken in connection with the accompanying drawing. It is to be expressly understood, however, that the drawing is for the purpose of illustration only and is not designed as a definition of the limits of the invention, reference being primarily had for this latter purpose to the appended claims.

Figure 2:
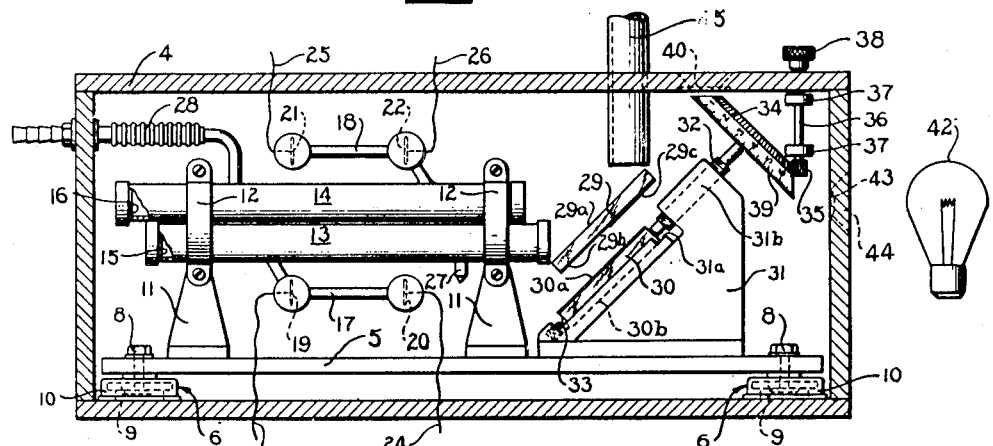
Figure 3:
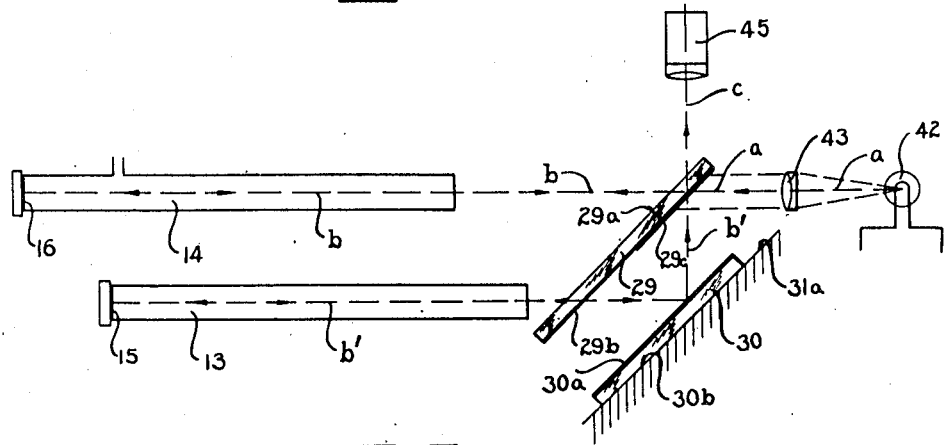

In the drawing, wherein like reference characters refer to like parts throughout the several views, Fig. 1 is a top plan view of the apparatus embodying the present invention;

Fig. 2 is a section taken along line 2—2 of Fig. 1 and illustrating the internal structure of said apparatus; and, Fig. 3 is a diagrammatic sketch, exaggerated in part, of the above device, illustrating the principle of operation of the interferometer.

It is well known that the barometric pressure of air varies as the temperature and density, so that, for any given temperature or any known temperature, a measure of the density of air is sufficient for a determination of the barometric pressure. It has been shown by repeated measurement that the composition of the dry air from any part of the world's atmosphere and even from the highest altitudes so far reached by man is so nearly constant that its index of refraction may be accepted as a valid measure of its density.

In the present invention, novel means employing the light interference principle have been provided for the measurement of the index of refraction of atmospheric air and for the conversion thereof into a barometric reading.

In the illustrated embodiment, the invention comprises a casing 4 which is suitably insulated and, if desired, the same may be air-tight so that a given temperature can be maintained therein. A base plate 5 is mounted to said casing through vibration absorbing supports 6, 6 and as shown, said supports comprise bolts 8, 8 which are fixed at one end to plate 5 and at the other end to rubber washers 9, 9, said rubber washers being mounted by suitable brackets 10, 10 on casing 4. As a result, washers 9, 9 absorb any vibrations imparted to said casing and reduce, if they do not wholly eliminate, any effect of said vibration upon base plate 5 and the apparatus mounted thereon. It will be understood, however, that various types of vibration absorbing means may be employed.

Integral with said base plate or otherwise suitably affixed thereto are supports 11, 11. Mounted on said supports and held in place by brackets 12, 12 are two chambers 13 and 14 of equal length and of similar construction. Both of said chambers are air-tight and insulated from the remaining apparatus within casing 4. The purpose of chambers 13 and 14 is to provide paths for beams of light, emanating from a single source, said beams being reflected through said chambers back to their plane of separation, and there caused to be re-united in such a way as to provide, by means of their interference or reinforcement, a means of comparing the optical lengths of the two chambers (geometric length being the same). Each part of the split beam passes twice through its appropriate chamber 13 or 14, being reflected from a mirror 15 or 16, at the far end. The path of each part of said split beam preferably contains the same amount of glass or other medium of high index and, except for one variable air distance, the same amount of external air path. Any change in optical paths introduced by a change in the index of refraction of the air contained in either of the chambers may be compensated by a change in the geometrical length of the variable air path.

For the purpose of comparison and as a test of the instrument setting, means are provided, in the form of transparent glass tubes 17 and 18 attached and connected to said chambers, for measuring the degree of vacuum in each of said chambers. The bulbous or spherical ends of each of said tubes contain electrical terminals 19, 20, 21, 22 connected to leads 23, 24, 25 and 26. Said leads are connected to a source of high potential (not shown) and the appearance of the luminous discharge which results when said potential is applied across the terminals 19, 20 and 21, 22, respectively, is a measure of the vacuum in the chambers 13 and 14, according to rules well known and catalogued. The resulting luminous discharge is sufficiently uniform under easily controlled conditions to be acceptable as an accurate indication of the degree of vacuum.

The lower of said chambers, namely, chamber 13, in the embodiment illustrated, is evacuated so as to provide a medium of substantially zero density for the passage of light therethrough, and thereafter opening 27 in chamber 13 is sealed. The reason for using an evacuated chamber as a standard is that a vacuum is more easily reproduceable and measurable than any standard pressure and is not affected by temperature and, in addition, any barometric altimeter based on a vacuum as a standard is subject to less error. Chamber 14 is at all times open to the atmosphere, a flexible open-ended tube 28 being connected to said chamber, the outer end of said tube passing through the wall of casing 4 at some static point where the pressure is to be determined. If desired, a drying chamber (not shown) may be incorporated at some suitable point in tube 28 to dry the small amount of air which will flow into and out of chamber 14 with fluctuations of pressure. The use of such a drying chamber does not vary the pressure in chamber 14, since the pressure of the dry air within the tubing 28 is equal to the combined pressure of the dry air and water vapor of the atmosphere.

In the operation of apparatus which employs the light interference principle, it is necessary that a ray of light be separated into two beams of substantially equal intensities and that said beams be directed over separate paths and then recombined into a single ray which is directed into a viewing instrument. Novel means for the separation of said beams are provided in the present invention, said means comprising two plane surfaced glass plates 29 and 30. The upper and lower surfaces 29a and 29b, respectively, of glass plate 29 are parallel to the upper surface 30a of plate 30. The right-hand portion 29c (as viewed in Fig. 3) of surface 29b is "half-silvered" so that a portion of a horizontal ray of light falling upon this surface will pass directly through the plate into the chamber 14 and the remaining portion of the ray will be reflected by the "half-silvered" surface onto the plate 30. Surface 30a of plate 30 upon which the reflected light beam falls is completely silvered.

In order to adjust the distance between plates 29 and 30 and yet maintain the existing parallelism between the surfaces 29a, 29b, and 30a, the lower surface 30b of plate 30 is ground so that its plane is oblique to the plane of surface 30a. A supporting surface 31a upon which the plate 30 is slidably mounted is provided by bracket 31, said bracket being rigidly mounted upon or integral with base plate 5. Any sliding movement of plate 30 in the direction of inclination increases or decreases the distance between plates 29 and 30, and the length of the path of light passing from 29c to 30a. However, the parallelism established between the surfaces 29a and 29b of plate 29 and surface 30a of plate 30 remains unchanged by said motion.

To control the sliding movement of plate 30 and thereby control the distance between the surfaces 29b and 30a, an accurately threaded, micrometer screw 32 is adapted to screw into the internally threaded bore in projecting portion 31b of supporting bracket 31 and to have one end thereof bearing upon an edge of plate 30. The opposite edge of said plate is acted upon by compressed coil spring 33, thereby maintaining the contact between the end of shaft 32 and the plate. Suitably fixed to or integral with the other end of said shaft is bevel gear 34. Rotation of gear 34 moves shaft 32 axially and causes plate 30 to slide along the bracket surface 31a, altering the distance between surfaces. It will be understood that any other suitable means, such as a parallel motion mechanism, may be used to adjust the distance between said surfaces.

Controlling the rotation of bevel gear 34 is pinion 35 which coacts therewith and which is fixed by any suitable means to shaft 36. Said shaft is mounted in bearings 37, 37, and extends outside of casing 4. Knob 38 is mounted on the extending portion of said shaft so that rotation of knob 38 will control the displacement of plate 30. The mechanism from 35 to knob 38 is arranged to act as a shock absorber by the introduction of soft rubber at suitable points, the purpose being to protect the sensitive mechanism of the micrometer screw from injury arising from accidental shock communicated through the external protruding knob.

To indicate the degree of rotation of shaft 32 and the consequent displacement of plate 30, a suitable scale 39 is calibrated upon the drum of bevel gear 34 and may be viewed through window 40 in casing 4. Said scale gives a reading up to a whole revolution of said gear. A second scale 41 adapted to give readings of the number of revolutions of said gear is provided on the surface of a part of window 40. The scales, when read together, give extremely accurate readings of the adjustment of the distances between plates 29 and 30.

Any suitable source of light can be utilized to provide the ray of light which is to be divided into beams. As shown, said source is an incandescent lamp 42. The light emitted by said lamp enters casing 4 through a lens 43 in an opening 44 in said casing. Said lens is preferably a collimator lens which produces parallel rays of light after the passage of said light through said lens.

The reflected and recombined beams are viewed by means of an optical arrangement commonly attributed to Pulfrich and consisting of a lens whose focal length is nearly the distance from said lens to the virtual images of the mirrors 15 and 16 at the far ends of the comparison chambers, and two or more other lenses arranged as a telescope 45 focused nearly on infinity. By this arrangement, said images of the two mirrors above mentioned will be in focus at the same time as the fringes which will appear when the optical paths of the respective beams are substantially equal and, hence, the cross wires 46 and 47 may be engraved in one of these mirrors or placed immediately in front of its surface and attached to it so that any one of said fringes may be centered between said cross wires. As a result, accidental movement of the telescope does not vitiate the relative positions of fringes and cross wires.

In operation, the ray of light a emitted by the source 42 passes through collimator lens 43, into casing 4, and then is partially transmitted through, and partially reflected from, the half-silvered surface 29c of plate 29. The undeviated portion b of ray a passes directly through plate 29 into chamber 14 from which it is reflected back along the path b to the half-silvered surface 29c and then, due to the inclination of plate 29, is reflected at substantially right angles to the original path and forms a part of combined ray c passing into the viewing instrument 45.

The reflected beam b' passes at right angles to the path a and then upon the mirrored surface 30a of plate 30 from which surface it is reflected through plate 29 into chamber 13. From chamber 13 the ray is reflected back along path b' and is reflected by the surface 30a of the plate 30 to the half-silvered surface 29b of the plate 29 through which a part of it passes and combines with the reflected portion of beam b to produce beam c.

The basic principle of the measurement of the index of refraction of air by interference is that if a ray of light be divided into two parts as heretofore described and the separate paths over which the divided ray passes be of equal optical lengths, then the image produced by the recombined ray will comprise a series of unique fringes. The fringes are apparent to the naked eye as such, and there is no need for a screen or any optical instrument to make them visible, although a telescope or some form of viewing instrument should preferably be used in the present invention so that the fringes and crosshairs may be easily seen in focus at the same time and without parallax. The central of said fringes, if the source of illumination is white light, is a black fringe readily discernible because the surrounding fringes on each side of it are of all the colors emitted by the source of light, are symmetrical about the black fringe, and become increasingly definite as they approach the central black fringe. Furthermore, only a single series of fringes with a single central fringe can possibly appear from the combined light and only when the paths passed over by the separate beams have been of equal optical length.

A unit of optical length may be defined as the length of time required for a wave length of light to pass through a unit of geometric length of a medium. Since the time required for the passage of light through a unit length of a medium is a measure of the index of refraction of that medium, it is obvious that the optical length of a path of light is a function of the geometric length in the direction of travel of the light and of the index of refraction of the medium through which the light travels.

Therefore, if two paths comprising several mediums are of equal optical length and of equal geometric length and one of said mediums is changed or has its index of refraction changed as by a change in density, then there will be a proportional change in the optical length of that path.

It follows, also, that the necessary change in the geometric length of either of said paths to once again produce paths of equal optical length will be proportional to the variation in index of refraction which has caused the change.

In the apparatus as described, the paths followed by the divided beams b and b' are of equal optical and geometric length when the mediums within the respective chambers 13 and 14 are of the same density and composition, i. e., have the same index of refraction. Since it is the purpose of the invention to measure the density changes of the medium within chamber 14, means have been provided for adjusting the geometric length of one of the paths.

In the embodiment as illustrated and heretofore described, the length of the path of the beam passing through reference chamber 13 is changed but it is understood that the same result could be accomplished by varying the length of the path of the beam passing through chamber 14, or if some different means, such as moving either mirror 15 or 16, be used for varying the length of one of the paths of light.

Adjustment of the geometric length alters the optical length and it is possible by observing the resulting fringes through the viewing instrument 45 and simultaneously rotating knob 38 to center the black fringe 48 between cross-hairs 46 and 47, i. e., make the two separate paths of light of equal optical length. If now, the density of the medium in chamber 14 is changed as by a change in barometric pressure, its index of refraction is also changed and the centrally located black fringe will be displaced from the center a distance depending on the amount of change in pressure of the gas in said chamber. Furthermore, since the distance by which plate 30 must be displaced to once again center the black fringe is proportional to the change in density, the scale 40 will have been displaced a certain number of divisions, in proportion to said change. It is obvious then that by suitable calibration of scales 40 and 41, a reading of the pressure of the air within chamber 14 may be had directly upon said scales for any one selected temperature. For other than the standard temperature of the air in the chamber, a correction must be applied which, however, depends only on the temperature of the air in the apparatus through which the light passses, since the effect of thermal expansion of the material parts of the apparatus is either self-compensating or too small to be taken into account. The diameter of bevel gear 34 and the pitch of threaded shaft 32 and the precision with which the same are machined will control the accuracy with which the scale may be calibrated.

In operation, therefore, a continuous reading of extreme accuracy of the barometric pressure may be had on scales 40 and 41 by maintaining fringe 48 centered between cross-hairs 46 and 47 with knob 38.

The sensitivity of the instrument will depend solely upon the length of the light path through the respective air and vacuum chambers and upon the accuracy with which the plates and the various reflecting surfaces are finished. In the present state of the art, lenses and surfaces may be had which will equip an instrument embodying the present invention to give readings accurate to plus or minus the pressure equivalent of a change of altitude of six feet near sea level. As a result, the present invention may be utilized as an altimeter to give altitude readings within six feet of the real altitude, provided, of course, that the barometric or ground pressure is determined to an equal accuracy by a similar instrument.

Any correction for temperature may be eliminated by calibrating the instrument at some given temperature and then by maintaining said temperature within the casing 4 and particularly within the chamber 14 during its use. Since the pressure within chamber 14 will equal that of the atmospheric air if it be open to the atmosphere, the difference in temperature, if any exists, between the atmospheric air and that within the chamber will not affect the pressure reading.

Where an instrument embodying the principles of the present invention is to be used as a barometer only and to an accuracy not requiring too high a refinement in the measurement of temperature, chamber 14 may be eliminated and the pressure within the casing 4 may be measured.

The instrument may be at any time calibrated by exhausting the comparison chamber 14 to a vacuum equal to that of the standard chamber 13, providing a source (such as a helium discharge tube) of monochromatic light of known wave length, and while letting in air slowly, counting the number of fringes passing the crosswires until room pressure and temperature is reached. Monochromatic light will produce a series of fringes of like color as an image whether the optical lengths of the paths are equal or not. However, any changes in the optical length of one of the paths moves the fringes at a rate proportional to the changing length of the path. By this means, a direct measurement of the index (density) of the air is made, depending only on the known length of the comparison chamber at the temperature measured, on the temperature of the gas filling this chamber at the end of the measurement and the change in the number of known wave lengths necessary to bridge the known geometrical length when traversing a vacuum and when traversing air (i. e., the number of fringes counted during the process of admitting the air). By this means, one or more points on the scale of the micrometer may be calibrated.

There is thus provided a device for accurate pressure readings, one that is comparatively simple of construction and comprises no delicate parts, although extreme accuracy of arrangement of the parts relative to each other and accurate machining and grinding of the various surfaces are essential. No moving parts except the control knob are exposed, minimizing the possibility of accidental injury or effect of weather conditions on the controls. The settings of the reflecting surfaces and the evacuation of the tube once made require little or no subsequent attention. Furthermore, the instrument may be moved readily from one place to another wtihout loss of accuracy or calibration and, should some doubt arise as to the accuracy of the calibration after transportation, the instrument may be very quickly recalibrated by exhaustion of comparison chamber 14, as hereinbefore described. The use of a vacuum as a standard permits the accurate calibration of the instrument at any time in a few minutes since the standard vacuum against which the instrument is originally calibrated can be readily reproduced.

Although only a single embodiment of the invention has been illustrated and described in detail, it is to be expressly understood that the same is not limited thereto, but that various changes may be made therein without departing from the spirit and scope of the invention. For a definition of the limits of the invention, reference will be had to the appended claims.

What is claimed is:

1. In a pressure measuring device, a casing, a chamber in said casing with a connection therethrough to the atmosphere, a second chamber in said casing evacuated and insulated from the interior of said casing, a source of light, means for permitting the passage of a beam of said light into the interior of said casing, means for dividing said beam of light into two separate beams and for directing one of said separate beams into one of said chambers and the other of said separate beams into the other of said chambers, means within each of said chambers for reflecting said beams back along their original paths, said dividing means serving as the means for recombining said reflected beams, means for viewing the image of the recombined beam, and means for varying the length of the path over which one of said divided beams travels to control the image in said viewing means.

2. In a barometric pressure measuring device, a casing, a chamber in said casing with a connection therethrough to the atmosphere, a second chamber in said casing evacuated and insulated from the interior of said casing, a source of light, means for dividing the beam from said source into two separate beams and for directing one of said separate beams into one of said chambers and the other of said separate beams into the other of said chambers, means for recombining said beams after passage through said chambers so as to give an image comprising a series of fringes, one of which is black, means for viewing the image of the recombined beam, means for varying the length of the path over which one of the divided beams travels to centrally locate the black fringe of said image in the field of vision of said viewing means, and means for measuring the extent of the variation of said beam path length and indicating said variation as an atmospheric pressure reading.

3. In a pressure measuring device, a chamber connected to the atmosphere, an evacuated chamber, a source of light, means for dividing a beam of light from said source into two separate beams and for directing one of said separate beams into one of said chambers and the other of said separate beams into the other of said chambers, means within each of said chambers for reflecting said separate beams back along their original paths, said dividing means serving as the means for recombining said reflected beams, and means for viewing the image of the recombined beams.

4. In a pressure measuring device, a chamber connected to the atmosphere, an evacuated chamber, a source of light, means for dividing a beam of light from said source into two separate beams and for directing one of said separate beams into one of said chambers and the other of said separate beams into the other of said chambers, means for reflecting said separate beams back along their original paths, said dividing means serving as the means for recombining said reflected beams, and means for viewing the image of the recombined beams.

5. In a pressure measuring device, a chamber connected to the atmosphere, a second chamber containing a reference medium of known index of refraction, said chambers being substantially parallel, a source of light, means located adjacent an end of each of said chambers, said means being adapted to divide a beam of light from said source into two separate parallel beams and to direct one of said parallel beams into one of said chambers and the other of said parallel beams into the other of said chambers, means for reflecting said parallel beams back along their original paths, said dividing means serving as the means for recombining said reflected beams, and means for viewing the image of the recombined beam.

6. In a barometric pressure measuring device, a casing, a chamber in said casing communicating with the medium whose pressure is to be determined, a second chamber containing a comparison medium having a known index of refraction, a source of light, means for dividing the beam from said source into two separate parallel beams and for directing one of said separate beams into one of said chambers and the other of said separate beams into the other of said chambers, reflecting means for directing said beams back along substantially their original paths after passage thereof through said chambers, means for recombining said beams so as to give an image comprising a series of fringes, means for viewing the image of the recombined beam, means for varying the length of the path over which one of the divided beams travels to centrally locate a predetermined one of said fringes in the field of vision of said viewing means, and means for measuring the extent of the variation of said beam path length and indicating said variation as a pressure reading.

7. In a barometric pressure measuring device, a casing, a chamber in said casing communicating with the medium whose pressure is to be determined, a second chamber containing a comparison medium having a known index of refraction, a source of light, means for dividing the beam from said source into two separate parallel beams and for directing one of said separate beams into one of said chambers and the other of said separate beams into the other of said chambers, reflecting means for directing said beams back along substantially their original paths after passage thereof through said chambers, said dividing means serving to recombine the beams so as to give an image comprising a series of fringes, means for viewing the image of the recombined beam, means for varying the length of the path over which one of the divided beams travels to centrally locate a predetermined one of said fringes in the field of vision of said viewing means, and means for measuring the extent of the variation of said beam path length and indicating said variation as a pressure reading.

ROY T. HURLEY.